3,472,357
SCRAPER CONVEYOR APPARATUS
Günther Ströcker, Dortmund-Schuren, Germany, assignor to Maschinenfabrik Gustav Schade, Dortmund, Germany, a company of Germany
Filed July 3, 1967, Ser. No. 650,778
Claims priority, application Germany, July 7, 1966, M 70,148
Int. Cl. B65g 65/28
U.S. Cl. 198—36                                7 Claims

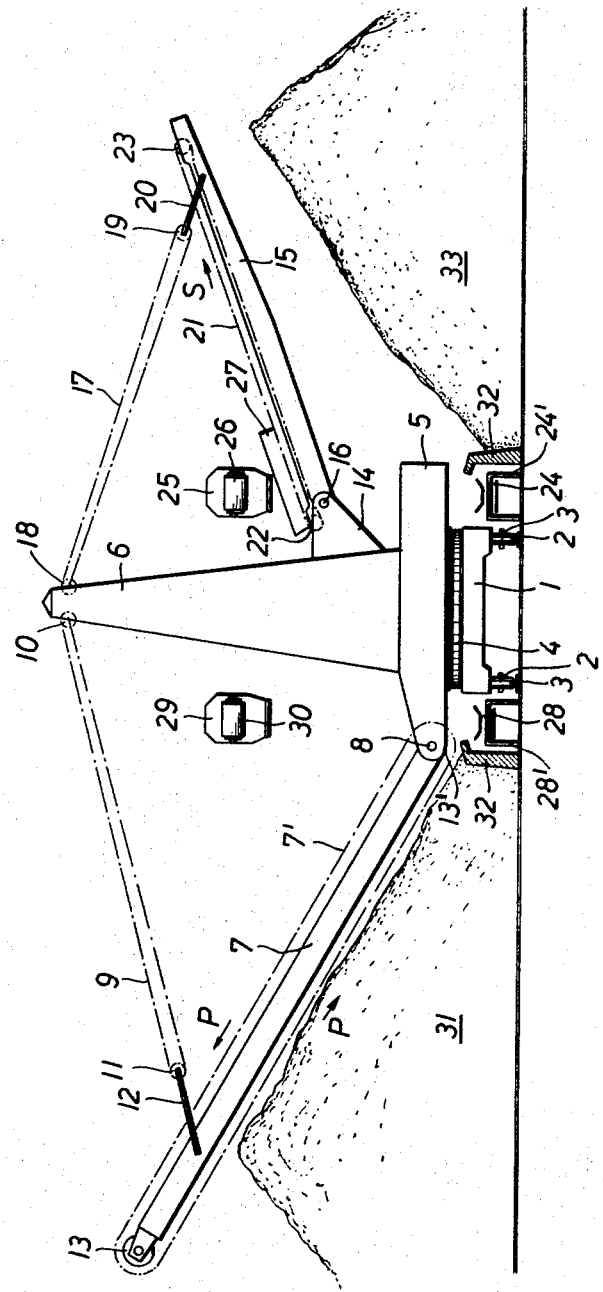

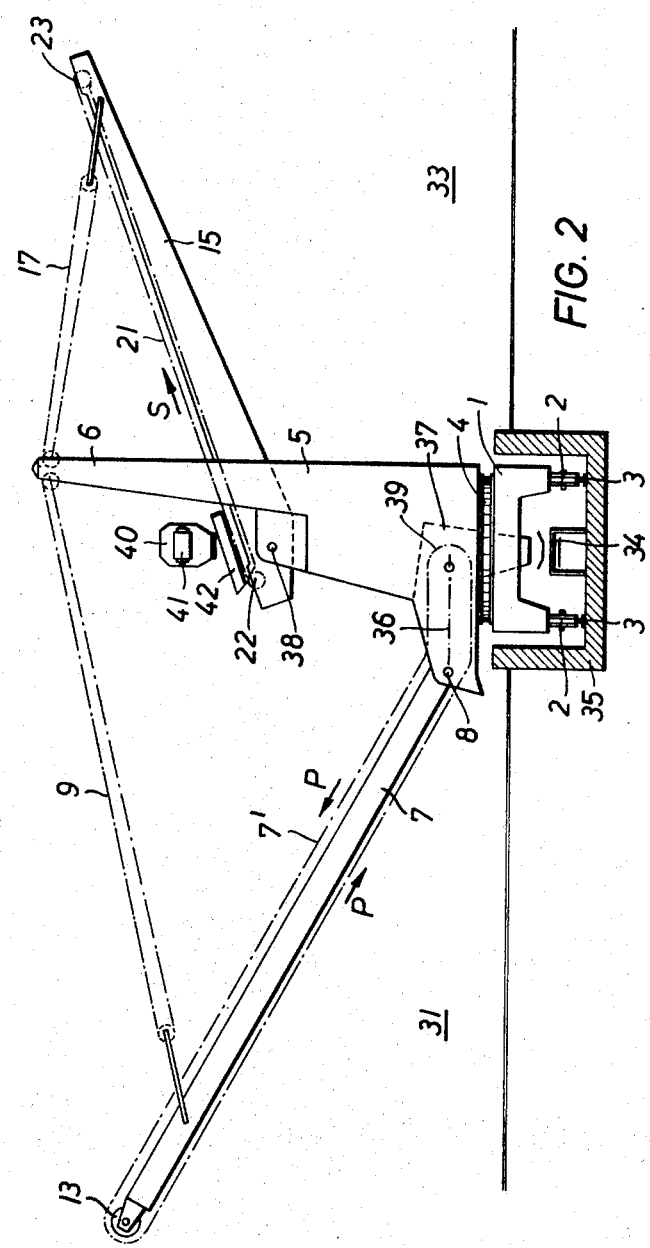

ABSTRACT OF THE DISCLOSURE

A scraper conveyor apparatus which includes a storing cantilever arm and a removing cantilever arm rotatably mounted on opposite sides of a frame is disclosed. Each of the cantilever arms is provided with conveyor means so that two dump areas may be simultaneously serviced.

---

The present invention relates in general to a loading apparatus having a boom or cantilever arm provided with a scraper conveyor and pivotably mounted on a frame or the like so as to remove bulk goods from silos, storage dumps etc.

To remove bulk goods, such as coal, fertilizer or other granular materials, from silos or from storage areas loading machines of the scraper conveyor type or dredgers, excavator cranes, shovel dredgers and other similar tools are commonly used. Loading machines of the scraper conveyor type are preferably used because of their ability to perform in a continuous mode of operation, and due to the fact that they can cover a wide area of operation by means of the cantilever arm. Moreover, during the removal operation, the cantilever arm permits a mixing of the bulk goods which may be stored in superimposed layers having different properties. Hardened bulk goods may also be easily removed by means of the scrapers carried along with the driven endless chains of the scraper conveyor.

The heretofore known scraper loaders, provided with a cantilever arm and a scraper conveyor mounted thereon are used solely to remove bulk goods from their storage areas; that is from a dump, with the scrapers working on the slope of the dump. For storing the bulk goods special conveyor means, such as belt conveyors, belt bridges or the like must be used.

It is an object of the present invention to provide in convenient manner a scraper loader, that is an apparatus having a boom or a cantilever arm with driven scraper means mounted thereon which may be used for the removal as well as for the storage of bulk goods so that the need for using two separate equipments for the removal and storage operation is avoided.

In accordance with the present invention, this object is achieved by providing an apparatus having two booms or cantilever arms the one of which is provided with a scraper conveyor, that is with scraper means connected with and driven by endless chains or the like for removal of stored bulk goods, whereas the other of the cantilever arms is provided with conveyor means, preferably with a belt conveyor capable of storing bulk goods into silos or storage areas. Therefore, it is possible to both remove stored bulk goods from a silo or a storage area and to store bulk goods by using only a single device. If desired, storing and removal of the bulk goods may be carried out simultaneously when two storage areas are to be serviced.

It is particularly advantageous, in accordance with one embodiment of the invention, to arrange the storing cantilever arm opposite the removing cantilever arm so that the storing cantilever arm balances at least to a great extent, the weight of the removing cantilever arm. The additional attachment of the storing cantilever arm does not increase the overall weight of the scraper loader as the dead weight used as a counterbalance in conventional scraper loaders is either partially or completely avoided in the scraper loader of this invention.

Furthermore, expenditures are reduced substantially with the scraper loader of this invention due to the fact that the dead weight used in conventional scraper loaders is partly or wholly replaced by the counterweight of the storing cantilever arm. Accordingly, the apparatus of this invention including the additional storing cantilever arm is not very more expensive than the known scraper loaders which are not provided with a storing cantilever arm. It is also advantageous that the wheel pressure on the tracks on which the scraper loader may run is not substantially increased by the additional cantilever arm.

Preferably, the removing and storing cantilever arms are mounted on a support or frame which rests on an undercarriage so that the storing and removing cantilever arms are rotatably mounted about a vertical axis. The storing cantilever arm is preferably pivotally mounted above the mounting point of the removing cantilever arm so that a sufficient dropping height for the storing cantilever arm is achieved without exceeding the 20° angle of inclination of a conveyor belt mounted on the storing cantilever arm.

It is also advantageous to place the feeding position of the storing cantilever arm vertically over the discharge position of the removing cantilever arm, whereby the feeding position of the storing cantilever arm and the discharge position of the removing cantilever arm are each arranged on or in alignment with the common vertical axis of rotation of the support or frame of the apparatus. This arrangement is particularly advantageous as only one service conveyor belt need be employed when two different storage areas are being serviced by the scraper conveyor since the service conveyor may be used for conveying the bulk goods to be stored as well as for conveying the bulk goods to be removed. Furthermore, this arrangement is also advantageous when servicing circular silos as the scraper conveyor is rotatable about the vertical axis of the circular silo and the feeding of the storing cantilever arm is achieved by the conveyor belt mounted thereon and directed towards the center of the circular silo.

Finally, the storing cantilever arm may also be arranged on the scraper conveyor in a manner so that it is movable about a vertical axis independently from the removing cantilever arm to store bulk goods onto the storage area. In this case, only the storing cantilever arm need be moved and not the portion which carries the removing cantilever arm. If desired, rotation of the removing cantilever arm about the vertical axis of the scraper loader may be avoided.

Other objects and features of the invention will be apparent from the following specification taken in connection with the attached drawings wherein:

FIG. 1 is a schematic side view of one embodiment of the novel scraper loader of this invention; and FIG. 2 is another embodiment of the scraper loader in a schematic side view.

The scraper loader shown in FIG. 1 comprises a lower frame or undercarriage 1 movably mounted and running on tracks 3 by means of driven rollers or wheels 2. An upper frame 5 is mounted by means of a rotating wheel or disc 4 on top of undercarriage 1, and is rotatable about a vertical axis. A center support 6 is mounted on upper frame 5. A removing cantilever arm 7, of known construction, is rotatably mounted on upper frame 5 for rotation in the vertical plane about a pivot axis 8. The rotating, lifting and lowering of cantilever arm 7 is accomplished by a known common hoisting device comprising a winch (not shown), and a hoisting cable 9 driven by the winch and guided over a roller 10 mounted on center support 6, and a roller 11 mounted on a swivel arm 12 pivoted to cantilever arm 7. Cantilever arm 7 is provided with scrapers of any known suitable type mounted between two endless conveyor chains 7' or belts. The conveyor chains 7' are guided over pulleys or chain drums 13 and 13' positioned at opposite ends of cantilever arm 7. Drum 13' is driven by suitable driving means (not shown) arranged on the upper frame 5 or on the side wall of the cantilever arm 7 so that the two parallel endless chains 7' connected by the scraper plates in short intervals may run during loading operation in the direction of arrows P in such a manner that the scrapers running on the lower side 7'' of the cantilever arm carry along the bulk goods from the slope of a dump 31 in the direction to the pivot axis 8.

Above pivot axis 8 a bracket 14 is mounted on center support 6 and angularly displaced by 180° from pivot axis 8. A storing cantilever arm 15 is rotatably secured to center support 6 for lifting and lowering operation about a horizontal pivot 16. The lifting and lowering operation is also performed by known, suitable mechanical means comprising a hoisting cable 17 driven by a winch (not shown) and guided over a roller 18 mounted on center support 6, and over a roller 19 mounted on a swivel arm 20 which is pivotally connected to cantilever arm 15.

Cantilever arm 15 carries an endless conveyor belt 21 and pulleys or belt drums 22 and 23 are positioned at opposite ends of cantilever arm 15 for driving and guiding the endless belt in the direction indicated by arrow S. Conveyor belt 21 is fed by a feeding conveyor belt 24 located at the right-hand side of tracks 3. The upper portion of feeding conveyor belt 24 is moved by a belt carrier or belt car 25 per se known running on tracks (not shown) into the range of conveyor belt 21, so that a front guiding roller 26 of the belt car 25 is positioned directly above the opening of a charging chute 27 for conveyor belt 21.

On the opposite side of the tracks 3, that is, on the left-hand side thereof, a second conveyor belt 28 is positioned with a similar belt car 29 which is also movable on tracks (not shown). A front roller 30 of the belt car 29 is positioned at the same height as roller 26 of conveyor carrier 25. The upper portion of the endless belt 28 is guided by means of rollers mounted in the belt car in loops in such a manner that in the zone in which the apparatus is working the upper portion of belt 28 is raised with respect to the belt frame 28' which is stationary mounted. As stated the belt 24 and the belt car 25 are of similar construction. The stationary frame of belt 24 is shown by 24'.

If bulk goods are to be removed from storage area or dump 31, cantilever arm 7 is lowered onto the slope of the dump 31 so that the scrapers driven by the endless chains 7' remove the bulk goods in a fine layer from the slope of the dump and convey them over a limiting wall 32 of the storage area onto the upper portion of conveyor belt 28 arranged just behind wall 32. During the removal of the bulk goods the loading apparatus is moved on tracks 3 along storage area or dump 31.

A second storage area or dump 33, located opposite storage area 31, may be serviced simultaneously with storage area 31 by storing cantilever arm 15. The bulk goods are fed to the belt 21 of cantilever arm 15 by belt conveyor 24, belt car 25 and roller 26. When the removal of the bulk goods stored at storage area 33 is carried out by cantilever arm 7, and/or a storing of goods on storage area 31 is carried out by storing cantilever arm 15, upper frame 5 and center support 6 are rotated together with cantilever arms 7 and 15 through an arc of 180° by means of a suitable drive (not shown) and rotatable wheel 4. However, belt car 25 of conveyor belt 21, and belt car 29 of conveyor belt 28 must be moved out of range so that a proper rotating movement of cantilever arms 7 and 10 may be performed. In this case, conveyor belt 28 provides the storing operation and conveyor belt 24 provides the removal operation.

With respect to the embodiment shown in FIG. 2, it can be seen that a conveyor belt 34 is provided which is disposed in a belt channel 35 in the center between tracks 3 of the loading apparatus and which serves for conveying the bulk goods to be stored as well as for conveying the bulk goods to be removed from the dump or storage areas 31 and 33. Cantilever arm 7 includes an offset portion 36 which extends above wheel 4 to the center of the loading apparatus to the upper open end of a charging funnel 37, so that the bulk goods removed from the slope of the dump are moved by the scrapers to the center axis of the scraper conveyor and moved through the opening of the charging funnel 37 and onto the upper portion of conveyor belt 34.

Pivot 38 of storing cantilever arm 15 is positioned at the center axis of scraper loader above the discharging point 39 of the scraper conveyor of cantilever arm 7. The feeding of storing cantilever 15 with bulk goods may also be carried out by conveyor belt 34 the upper portion of which is guided by rollers 41, one of which is shown in FIG. 2, mounted in a belt car 40 running on tracks, so that the bulk goods conveyed on the upper raised portion of the belt 34 will be discharged by roller 41 into charging chute 42, from where it will be conveyed to the free head end portion of the cantilever arm so that it will be discharged over belt drum 23. To achieve this roller 41 of belt car 40 is located directly above charging chute 42 of conveyor belt 21. The receiving or feeding end of conveyor belt 21 is located directly above the discharging point of cantilever arm 7 at the swivel center point of the scraper conveyor.

Thus, it is apparent that by the use of the scraper conveyor apparatus described above, it is possible to both store and remove bulk goods by the use of a single conveyor, provided that two separate storage areas 31 and 33 are present.

If bulk goods are to be stored onto storage area 31, or if bulk goods are to be removed from storage area 33, the upper frame of the apparatus may again be moved through an arc of 180° about a vertical axis. However, conveyor car 40 should be moved out of range so that a proper rotating of the scraper conveyor may be performed.

What is claimed is:

1. Apparatus for removing and storing bulk goods from and to a dump comprising:
   movable frame means,
   first cantilever arm means for removing bulk goods from the dump, said arm pivotably mounted on said frame means for swinging through a vertical plane about a pivotal axis, said first cantilever arm means being provided with a scraper conveyer for scraping and carrying along the bulk goods to be removed from the slope of the dump in a downwards direction of the slope toward the foot of the dump.
   second cantilever arm means for storing bulk goods, said second arm pivotably mounted on said frame means for swinging in a vertical plane independent of said first cantilever arm means,
   first conveyer means arranged on said second cantilever arm means for transporting said bulk goods to be stored toward the free head end portion of said second cantilever arm means, and
   second conveyer means for conveying the bulk goods to be stored to said first conveyer means on said second cantilever arm means independent of said scraper conveyer of said first cantilever arm means.

2. Apparatus as defined in claim 1 wherein said first and second cantilever arm means are disposed on opposing sides of said upper frame.

3. Apparatus as defined in claim 1 wherein said upper frame being mounted for rotation about a vertical axis on the lower frame of a undercarriage.

4. Apparatus as defined in claim 1 wherein the conveyor means of said second cantilever arm means is a belt conveyor mounted in the longitudinal direction of the cantilever arm means.

5. Apparatus as defined in claim 4 wherein the feeding point of the belt conveyor on said second cantilever arm is located above the discharging point of the scraper conveyor on said first cantilever arm means.

6. Apparatus as defined in claim 5 wherein the said feeding point and the said discharging point are each positioned on the vertical axis of rotation of said upper frame.

7. Apparatus as defined in claim 1 wherein said second cantilever arm means is mounted on said upper frame for rotation about a vertical axis with said first cantilever arm means.

References Cited
UNITED STATES PATENTS 897,893   9/1908   Hamilton _____ 214—10 X

FOREIGN PATENTS 406,009   11/1924   Germany.

EDWARD A. SROKA, Primary Examiner